Patented May 9, 1939

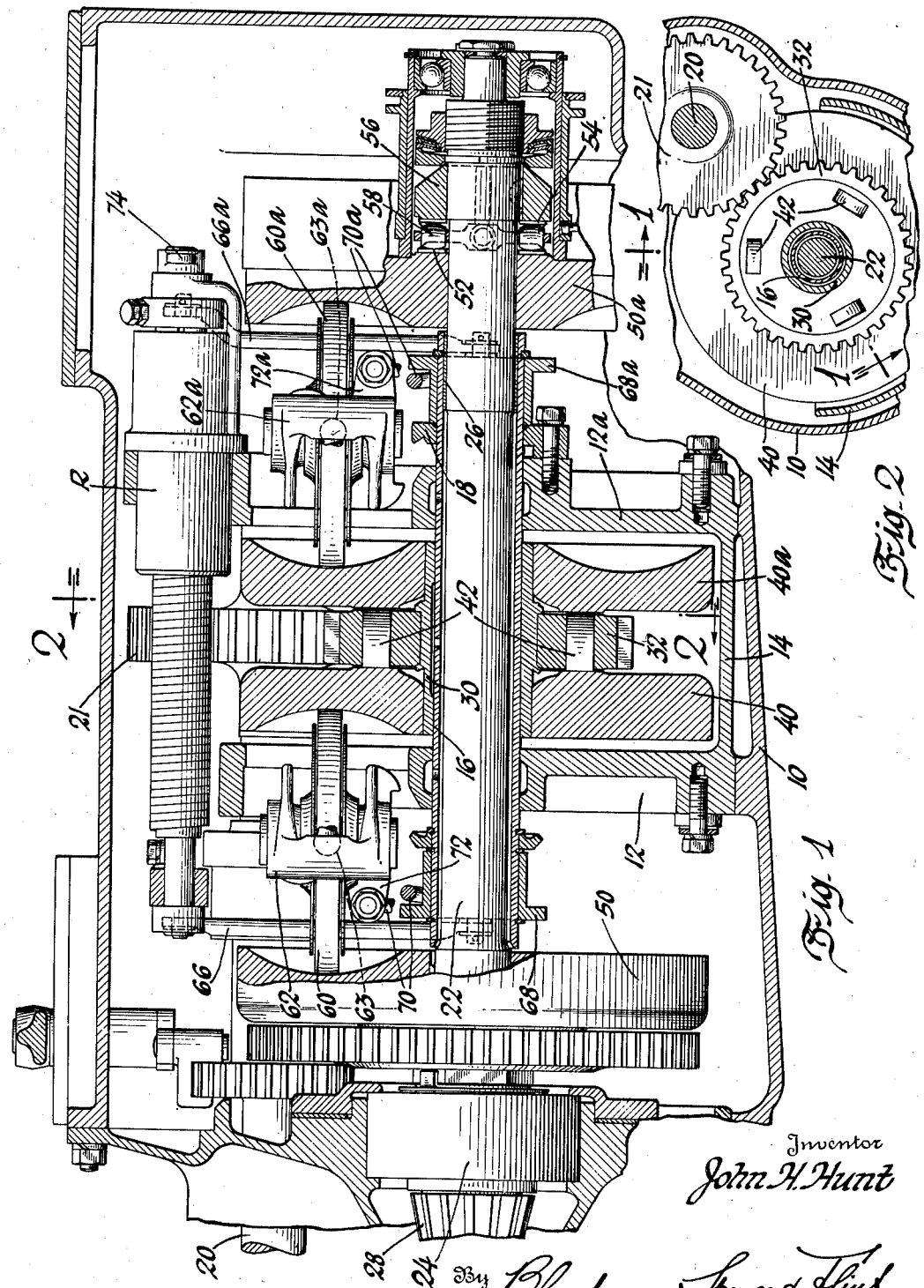

2,157,238

UNITED STATES PATENT OFFICE 2,157,238

DOUBLE TORIC FRICTION TRANSMISSION

John H. Hunt, Detroit, Mich., assignor to General Motors Corporation, Detroit, Mich., a corporation of Delaware Application May 7, 1934, Serial No. 724,244

6 Claims. (Cl. 74—281)

This invention relates to duplex friction race and roller transmission mechanisms wherein the power of the input element is divided equally and transmitted to an output element through two sets, arranged in parallel, of driving and driven races with interposed rollers. It is intended particularly for use in motor vehicles for transmitting power from the engine to the driving wheels.

A typical duplex transmission mechanism to which this invention is applicable comprises two end races connected to a concentric shaft, driven by or driving two intermediate races (or one double faced race) through interposed friction rollers. Means for applying an axial force for squeezing the rollers between driving and driven races is deemed necessary to prevent slipping of the engaging surfaces while rotating in contact. In order that the squeezing force be not greatly in excess of that necessary to prevent slippage it is desirable to utilize automatic pressure-applying means, including cam or equivalent mechanism, responsive to torque for applying axial pressure approximately in proportion to increases of resistance to rotation of the output element.

Where, in a duplex friction race-and-roller mechanism of this type, having two corresponding races relatively fixed and two angularly movable relatively, torque loading is applied by cams or equivalents reacting to angular movement of one race relative to the corresponding race in the other half, a sudden change of load on the output element, for example, sufficient to cause the torque loading device to function and resulting in a momentary shift of load from the set or half of the mechanism that includes the torque loading device, to the other set or half, may cause scoring or tearing of the raceways and roller treads of the latter set or half of the transmission.

It is an object of this invention to enable torque loading means to be utilized on one half only of a duplex friction race and roller transmission mechanism, without overloading the other half during such interval of time as increasing load on the output element is "winding up" the camming or other torque responsive device associated with the other half.

This object is accomplished in the illustrated embodiment by separating the intermediate races, mounting them to be capable of relative rotation, and transmitting power to or from them through an equalizing or differential mechanism engaging both races.

In the accompanying drawing:

Fig. 1 represents a section through a transmission casing exposing a friction race and roller transmission mechanism, partly in section, and embodying this invention;

Fig. 2 is a cross section on a plane indicated by line 2—2, Fig. 1.

One embodiment of the invention is illustrated in a duplex friction race and roller mechanism for motor vehicles of what is sometimes referred to as the "double toric" type wherein four races with toroidal raceways are disposed coaxially about an output shaft and the two central races function as driving races during forward driving of the vehicle and are rotated by gearing operated by an input shaft out of line with the output shaft.

In the drawing, 10 indicates a casing for housing a power transmission mechanism including two sets of races with opposed toroidal raceways and interposed rollers for transmitting rotation from one race of each set to the other race thereof. Secured within the housing is a supporting and strengthening frame comprising two spaced apart parallel members 12, 12a united by a parti-cylindrical web 14 and a frame tube 16, snugly fitted in central holes in said members. Tube 16 is locked to member 12a by a collar 18, secured rigidly to the tube, preferably by a weld, and bolted to said member. Members 12 and 12a have each a plurality of openings symmetrically arranged around the center for admitting the interposed transmission rollers referred to. The casing 10 and the frame members described support suitable bearings for input and output shafts and other elements necessary to the operation and control of the transmission mechanism.

A driving or power input shaft 20, designed to be rotated by an engine or other suitable prime mover (not shown), enters the casing 10 through the front end (the left end in Fig. 1). A gear 21, inside the casing is adapted to be directly connected to shaft 20. A driven or power output shaft 22 is journaled at 24 in the casing 10, and at 26 in the rear end of tube 16 and is substantially parallel with shaft 20. The front end of shaft 22 carries a pinion 28, intended to mesh with an axle driving gear (not shown). Output shaft 22 is annularly spaced from the inner wall of tube 16 forward of the bearing at 26. The annular spacing between shaft and tube not only provides for circulation of lubricant but enables the middle or driving races to be supported concentric with shaft 22 without imparting strain to it.

Hub-like tube 30, which surrounds and is rotatable on frame tube 16, between members 12 and 12a, supports a gear 32 fixed to its midportion and meshing with said gear 21. Parts of the tube 30 protruding from the faces of gear 32 serve as bearings for driving races 40, 40a. Gear 32, which is arranged between races 40 and 40a carries a plurality of differential power transmitting elements whereby races 40 and 40a may be rotated by and with gear 32. Said differential elements are shown as rollers 42, adapted to rotate about radial axes within slots formed through gear 32 as shown in Fig. 2. In Fig. 1, two of the three rollers 42, are shown, as in a section in two planes indicated by line 1—1 in Fig. 2. The diameter of each differential roller is enough greater than the thickness of gear 42 that driving races 40 and 40a may contact with the rollers without rubbing or touching the faces of the gear.

Driven races 50, 50a rotate with and impart rotation to output shaft 22 when the vehicle is being driven forward, said driven races rotating oppositely to driving races 40, 40a since both driving and driven races are in tractive engagement with intermediate power transmission rollers to be described. Driven race 50 is fixed to shaft 22 as by a key and abutment preventing rotative movement on the shaft and axial movement forward. Race 50a is capable of axial movement and limited angular movement on shaft 22 as permitted by a torque responsive loading means of known type comprising, for example, the cam surfaces 52 on the back of race 50a, cam surfaces 54 on the front of abutment collar 56 which is keyed to the shaft, and torque loading rollers 58 disposed between said cam surfaces. Spring loading means of suitable type may be associated with the torque loading means.

A torque and spring loading means suitable for use with this invention is disclosed in U. S. Patent #1,947,044.

Power transmitting intermediate rollers referred to, indicated by reference numerals 60, 60a, are mounted between the limbs of forked carriers 62, 62a, respectively disposed between driving and driven races 40 and 50, and 40a and 50a. These carriers are moored by universal joints 63, 63a, to the supporting members 12 and 12a, and support the rollers so that their ratio positions may be changed as by inclining them about axes passing through their points of contact with the races. In the construction shown the rollers can be adjusted to different ratio positions and maintained in any desired position by the ratio control device R, which has at each end an arm connected respectively, to links 66, 66a, which are also connected to collars 68, 68a, rotatably mounted on central tube 16. Other links 70, 70a extend from collars 68, 68a, to lugs 72, 72a, on carriers 62, 62a. A rocking movement imparted to the arms of control device R by manual or other means acting on an arm 74, will move the carriers, swinging them about their moorings 63, 63a, in a plane transverse of the race axis. The rollers disposed between the limbs permit some movement of the carriers axially of the rollers and thus, although the rollers are held between the races so that they cannot slide thereon, the angular movements of the carriers causes the rollers to incline, as described.

The particular rollers, roller carriers and control devices shown constitute no part of this invention.

During forward driving of a vehicle equipped with the transmission mechanism disclosed, gear 21 is being rotated by the prime mover in a clockwise direction as viewed from the front of the vehicle or (for convenience of reference) counter clockwise as viewed in Fig. 2. Gear 32, therefore, rotates reversely, or clockwise as viewed in Fig. 2. During steady power input and output, races 40 and 40a rotate clockwise in unison with gear 32 and with each other, and, as power is transmitted from races 40 and 40a to races 50 and 50a by intermediate similar rollers 60 and 60a, races 50 and 50a, rotate in unison counter to the rotation of races 40 and 40a. Since races 50 and 50a are drivingly mounted on shaft 22 the latter is rotated by them counter clockwise as viewed in Fig. 2, driving the vehicle wheels (not shown) in a direction to move the vehicle forward. Under these conditions there is no relative angular motion between the cam abutment collar 56 fixed to shaft 22 and the race 50a.

Should the input power or the load on the output shaft be suddenly changed, for example, substantially increased, race 50a will rotate slightly with respect to cam abutment 56, thereby causing the torque loading rollers 58 to wedge the race 50a and shaft 22, carrying race 50, axially in opposite directions, thus increasing the pressure between races and rollers, and making it possible, thereafter, for the races and rollers to transmit more torque without causing the rollers to slip on the races.

If the races 40, 40a, were integral or otherwise joined so that there could be no relative rotation between them, the momentary relative velocities of races 40 and 50, in one-half of the transmission mechanism would be different from the momentary relative velocities of races 40a and 50a in the other half of the transmission mechanism when the torque loading cams 52, 56 move angularly with respect to one another, since race 50 is keyed to shaft 22 and cannot turn with respect to it, while race 50a can rotate with respect to said shaft and must so rotate in order to cause the torque loading device to function. Therefore, under the conditions assumed, there must occur a slip between races and rollers somewhere, presumably in that half of the transmission mechanism that is not equipped with the torque loading cams and rollers and which, momentarily, during functioning of the torque loading device, carries most of the load. Should a slip of rollers on races occur when the whole transmission mechanism is heavily loaded, permanent damage to the contacting surfaces would probably result.

In order that a single torque loading device, coacting with one element of one-half only of a duplex race and roller transmission, may be utilized with safety to the working surfaces of races and rollers, the intermediate races in accordance with this invention are independently mounted so as to be capable of relative rotation and are in power transmitting connection with an external power element by a differential mechanism as illustrated. In this mechanism, should there be a sudden increase of load on the output shaft 22, for example, sufficient to overcome the elastic pressure of the spring loading devices, which tend to maintain the cams 52 and 56 with the rollers 58 engaging the central depressions of the cams, race 40a would rotate momentarily faster than race 40, equalizing roller 42 rolling on the back surfaces of said races and race 50a will momentarily rotate faster than shaft 22 and cam abutment 56, thus causing rollers 60, 60a to be squeezed more tightly between the races. No slipping of the roller treads on the raceways can occur because of the compensatory rolling of the differential rollers 42 on the races 40, 40a. No momentary transfer of load occurs between the two halves of the transmission.

The same capacity of equalizing load exists if unequal rotation, or tendency to rotate, of the two ends of a duplex transmission occurs by reason of twisting of shaft 22 under increase of load, or by inequalities of machining in the two halves of the transmission.

It will be obvious to one skilled in the art that modifications in the arrangement and details of construction of the elements may be made without departing from the spirit of the invention, which involves the use of a single torque loading device reacting to the torque existing in one-half of a duplex race and roller transmission mechanism and transmitting power to or from corresponding elements in each half of the transmission by a differential mechanism.

I claim:

1. A duplex race and roller transmission mechanism consisting of two similar halves arranged to receive the input power and transmit it divided substantially equally between the two halves, a torque loading device adapted to increase the pressure between the contact surfaces of races and rollers in proportion to torque requirements, said torque loading device arranged to receive the torque of one-half only of the transmission, and a differential mechanism between two corresponding elements of the two halves of the transmission mechanism whereby the torque in the two halves is maintained substantially equal.

2. A duplex friction race and roller power transmission mechanism comprising a pair of end races having a driving connection with each other, one of said end races partaking of all rotary movement of the driving connection and the other being capable of limited axial and angular movement relative to said driving connection, a torque responsive device rendered effective by said relative angular movement of said one race for forcing said end races toward each other, two rotatable intermediate races capable of relative angular motion, and a differential power transmitting mechanism in engagement with both intermediate races.

3. A duplex friction race and roller power transmission mechanism comprising intermediate adjacent, coaxial races, a pair of end races capable of differential angular movement, and two sets of rollers in power transmitting engagement with said intermediate and end races, a gear coaxial with and disposed between said intermediate races, and rolling bodies angularly movable about radial axes within spaces in the gear, said rolling bodies being in rolling engagement with both races.

4. A transmission mechanism consisting of power input and output shafts, a duplex friction transmission mechanism consisting of two similar halves arranged in parallel about the axis of one of said shafts so as to receive power from the input shaft divided substantially equally by the said halves and transmitted equally to the output shaft, and a differential power transmitting connection between said halves.

5. A duplex friction race and roller power transmitting mechanism comprising a power input and a power output shaft, a pair of coaxial end races mounted on one of said shafts and having a driving connection therewith, a pair of intermediate adjacent races coaxial with said last-named shaft and rotatable independently thereof, one of said end races being mounted on the shaft to partake of all rotary and endwise movements thereof and the other end race being mounted so as to have a limited rotational movement with respect to said shaft, a torque loading device arranged to convert relative rotational movement of shaft and last mentioned race into a relative axial movement in order to squeeze the races and rollers together with a pressure proportionate to the transmitted torque, and a differential power transmitting means between the intermediate races and the other shaft.

6. A duplex friction race and roller power transmitting mechanism comprising a power transmitting shaft, two similar sets of driving and driven races coaxial with said shaft, similar rollers in power transmitting engagement with the driving and driven race of each set, and a differential power transmitting means comprising a gear freely rotatable about and relative to the power transmitting shaft, said gear carrying a differential member in engagement with corresponding races of said two sets, said differential member being capable of angular movement about an axis substantially in a radius of the gear.

JOHN H. HUNT.